United States Patent [19]

Ono

[11] Patent Number: 4,877,955

[45] Date of Patent: Oct. 31, 1989

[54] OPTICAL UNIT WITH DETACHABLY-MOUNTED OPTICS TO MAINTAIN HERMETIC SEALING OF THE UNIT

[75] Inventor: Shuji Ono, Kanagawa, Japan

[73] Assignee: Fuji Photo Film Co., Ltd., Kanagawa, Japan

[21] Appl. No.: 183,805

[22] Filed: Apr. 20, 1988

[30] Foreign Application Priority Data

Apr. 20, 1987 [JP] Japan .................................. 62-96833

[51] Int. Cl.$^4$ .............................................. H01V 5/02
[52] U.S. Cl. ...................................... 250/239; 250/235
[58] Field of Search ............... 250/234, 235, 236, 216, 250/239; 350/6.5, 6.6, 6.7, 6.8, 6.9, 6.91; 358/293, 294

[56] References Cited

U.S. PATENT DOCUMENTS 3,518,437  6/1970  Riggs .................................. 250/239
3,631,248 12/1971  Johnson ............................. 250/236
4,796,963  1/1989  Yoshimura ......................... 350/6.8

Primary Examiner—David C. Nelms
Attorney, Agent, or Firm—Sughrue, Mion, Zinn, Macpeak & Seas

[57] ABSTRACT

In an optical unit for use in a light beam scanning apparatus, a housing that covers optical elements of which the optical system of said apparatus is composed is provided, and the optical elements that need occasional replacement are grouped into blocks as small units which are adapted to be individually remountable in the process of replacement without destroying the hermeticity of the interior of the housing. Being so designed, the optical unit enables the necessary optical elements to be sufficiently dustproof to ensure reliable operation of the light beam scanning apparatus.

4 Claims, 2 Drawing Sheets

OPTICAL UNIT WITH DETACHABLY-MOUNTED OPTICS TO MAINTAIN HERMETIC SEALING OF THE UNIT

BACKGROUND OF THE INVENTION

1. Field of the invention

The present invention relates to an optical unit for use in a light beam scanning apparatus. More particularly, the present invention relates to an optical unit in which optical elements serving as components of the optical system of a light beam scanning apparatus that scans an object two-dimensionally are adapted to be detachably mounted in a housing in such a way that the hermeticity of its interior is maintained. Examples of two-dimensional scanning apparatus with a light beam include reading a radiation-produced image from a stimulable phosphor sheet by irradiation with exciting light, and recording an image on a photographic material by irradiation with a light beam.

2. Disclosure of the Prior Art

The most familiar method for obtaining a radiation-produced image as a visible image is to use a radiographic system which is the combination of sensitizing paper and a radiographic film having emulsion layers comprising a silver halide light-sensitive material. Recently, a radiation-produced image converting system using a stimulable phosphor has drawn researchers' attention as a substitute for the radiographic system. Certain phosphors, when exposed to various forms of radiation such as X-rays, α-rays, β-rays, γ-rays, electron beams and ultraviolet rays, store part of the energy possessed by the radiation. When such phosphors are irradiated with exciting light such as visible light, they produce stimulated emission in a quantity corresponding to the stored energy. Phosphors exhibiting such properties are collectively referred to as stimulable phosphors.

A system has been proposed for recording and reproducing radiation-produced image related information by using a stimulable phosphor. According to this system, the radiation-produced image related information of an object such as the human body is first stored in a sheet having a layer of stimulable phosphor (which is hereinafter referred to as "a stimulable phosphor sheet" or simply as "a phosphor sheet"). The sheet then is scanned with exciting light to produce stimulated emission, which is detected with a photoelectric converter to obtain electrical image signals to be subsequently processed to produce an image of the object which is highly adapted for diagnostic purposes. For this system, reference is made to Unexamined Published Japanese Patent Application Nos. 12429/1980, 11395/1981, 163472/1980, 104645/1981, 116340/1980, etc.

In one application of this system, the radiation-produced image related information stored in the stimulable phosphor and which has been converted to electrical signals is subjected to appropriate signal processing. The resulting electrical signals are used to output a visible image on a recording material such as a photographic material or on a display such as CRT, thereby producing an image of the object which is highly adapted for diagnostic purposes, or which has improved adaptability for image reading.

In order to read image related information from the stimulable phosphor sheet in the radiation-produced image recording and reproducing system described above, or for the purpose of recording said image related information on a photographic material, the stimulable phosphor sheet or photographic material is scanned in a two-dimensional way with a light beam scanning apparatus. While this light beam scanning apparatus performs sub-scanning by transporting the object to be scanned, it achieves main scanning in a direction substantially perpendicular to the direction of transport by deflecting the light from a light source such as a laser oscillator with a light deflector such as a galvanometer mirror. In applying this light beam scanning apparatus to an image reading (reproducing) apparatus, the stimulable phosphor sheet is scanned by excitation with a laser beam and the resulting stimulated emission from the sheet is detected to read the image related information stored in the recording medium, namely, the stimulable phosphor sheet.

In application of the same light beam scanning apparatus to an image recording apparatus, a light beam is modulated typically with an accousti-optical modulator (AOM) on the basis of an image related information signal and the intended image related information is recorded by scanning a recording medium (e.g. a photographic material) with the modulated signal.

Whether image related information is reproduced or recorded with the above-described light beam scanning apparatus, extremely high levels of precision are required not only with respect to scanning parameters (e.g., scanning speed and the amount to be scanned) but also in terms of the quantity and luminance of the light beam with which the object to be scanned in sheet form is irradiated.

A laser, light deflector, optical filter, reflector mirror and other optical elements that make up the optical system of a light beam scanning apparatus are highly sensitive to dirt or dust particles or other forms of soil. If such foreign matter is deposited on the optical elements, the light beam is subject to random reflection or produces a shadow that causes unevenness in the quantity and luminance of the light beam. If the object to be scanned in sheet form is irradiated with alight beam whose quantity or luminance is erroneous, abnormal or uneven, the reproduced or recorded image related information can either lack sharpness due to unevenness or turn out to be erroneous. In other words, the finally reproduced image might produce clear spots or shadows that prevent the viewer from making the correct diagnosis.

The light beam scanning apparatus is usually enclosed with the housing of a radiation-produced image reading or recording apparatus and the chance of dirt or dust ingress is fairly small. However, when the housing is opened to change optical elements, not only does the ingress of dust or dirt occur, but also the dirt particles that have built up in various parts of the housing as a result of prolonged use of the apparatus will become suspended in the atmosphere, and the deposition of dirt or dust particles or other forms of soil on various optical elements of the light beam scanning apparatus is unavoidable.

SUMMARY OF THE INVENTION

The present invention has been accomplished in order to solve the aforementioned problems with the prior art optical unit for use in a light beam scanning apparatus such as one which scans a sheet material such as a stimulable phosphor sheet or a photographic material two-dimensionally by irradiation with a one-dimensionally deflected light beam. The optical unit provided by the present invention has a housing that covers optical elements of which the optical system of the light beam scanning apparatus is composed, and the optical elements that need occasional replacement are grouped in blocks as small units which are adapted to be individually remountable during replacement without destroying the hermeticity of the interior of the housing. Being so designed, the optical unit of the present invention allows the necessary optical elements to be sufficiently dustproof to ensure reliable operation of the light beam scanning apparatus.

Generally, the present invention provides an optical unit that is to be used in a light beam scanning apparatus and which has a housing and an optical element accommodated in its interior, said optical element being adapted to be detachably mounted in said housing from its outside in such a way that hermeticity is maintained in its interior.

In a preferred embodiment, the light beam scanning apparatus is of a type that scans a stimulable phosphor sheet in a two-dimensional way by illumination with a one-dimensionally deflected light beam, so as to read stimulated emission in association with radiation-produced image related information.

In another preferred embodiment, the light beam scanning apparatus is of a type that records radiation-produced image related information on a photographic material by scanning it two-dimensionally with a one-dimensionally deflected light beam.

In still another preferred embodiment, the optical element is at least one member selected from among a laser light source, an optical filter, a beam expander, a reflector mirror, a light deflector, and a scanning lens.

BRIEF DESCRIPTION OF THE DRAWINGS

FIG. 2b is a cross-sectional view along the line II—II of FIG. 2a.

DESCRIPTION OF THE PREFERRED EMBODIMENT

The optical unit of the present invention is described hereinafter with reference to the preferred embodiment shown in the accompanying drawing.

Figure 1:
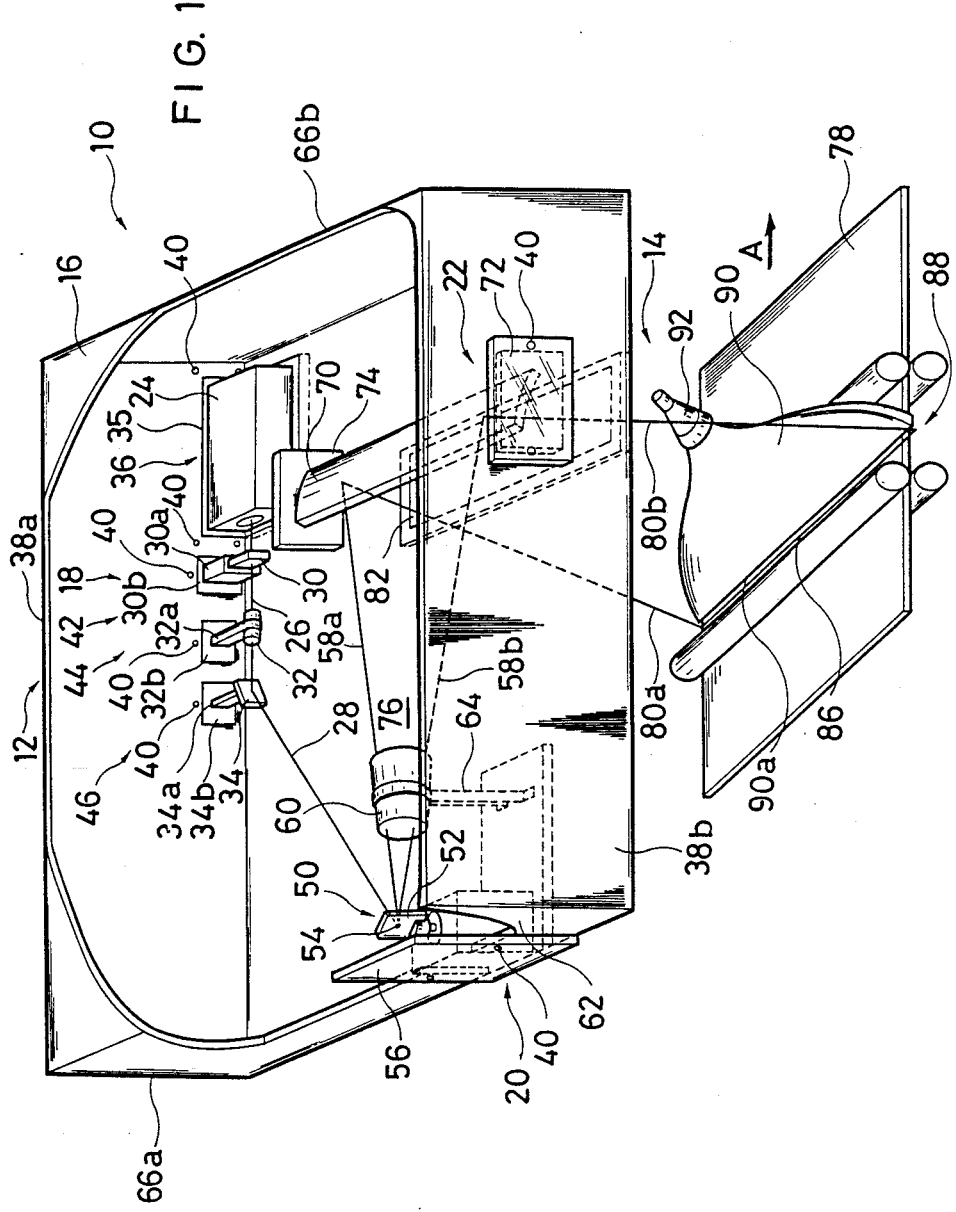
FIG. 1 is a perspective view that shows schematically a light beam scanning apparatus incorporating the optical unit of the present invention.

FIG. 1 is a partially cutaway perspective view showing schematically a light beam scanning apparatus incorporating the optical unit of the present invention.

The light beam scanning apparatus generally indicated by 10 consists of an optical unit 12 and a sub-scanning unit 14. The optical unit 12 contains within a housing 16 a light source section 18, a light deflector block 20 and a reflector mirror block 22 as optical elements that make up the optical system of the apparatus 10.

The light source section 18 is composed of a laser light source 24 incorporating a laser oscillator, an optical filter 30 that cuts off the unwanted wavelength region of a laser beam 26 radiated from the laser light source 24, a beam expander 32 that closely controls the diameter of a cross section of the laser beam 26, and a reflector mirror 34 that changes the direction of the laser beam 26.

The laser light source 24 is fixed on an L-shaped member 35 to form a laser light source block 36. The laser light source block 36 is attached to the side wall 38a of the housing 16 by fastening means 40 such as screws and the laser light source 24 can be inserted into, or extracted from, the housing through the side wall 38a as required.

The optical filter 30 is coupled to a mounting plate 30b via support member 30a to form an optical filter block 42. The beam expander 32 is coupled to a mounting plate 32b via support member 32a to form a beam expander block 44. The reflector mirror 34 is coupled to a mounting plate 34b via support member 34a to form a reflector mirror block 46. Each of the optical filter block 42, beam expander block 44 and the optical filter block 42 are attached to the side wall 38a of the housing 16 by fastening means 40 such as screws in such a way that hermeticity is maintained in the interior of the housing. These blocks can be inserted into, or extracted from, the housing through the side wall 38a as required.

The reflector mirror 34 is designed in such a way that it reflects the laser beam 26 to travel on a path 28 and to fall exactly on the deflecting point 54 of a galvanometer mirror 52 in a light deflector 50.

The light deflector block 20 is composed of an L-shaped member 56, the light deflector 50 mounted on the L-shaped member 56, and a scanning lens 60 by which the laser beam 28 that has been deflected with the galvanometer mirror 52 in the light deflector 50 to cover the scan range from 58a to 58b is converged on the surface to be scanned. The galvanometer mirror 52 is swung through a predetermined angle by means of the galvanometer 62 so as to perform scanning with the laser beam 28 over the range defined by 58a and 58b. The laser beams ranging from 58a to 58b are directed toward the reflector mirror block 22. The scanning lens 60 is mounted on the L-shaped member 56 via support member 64. The L-shaped member 56 is attached to the side wall 66a of the housing 16 by fastening means 40 such as screws in such a way that hermeticity is maintained in the interior of the housing. The light deflector block 20 can be detached from the housing as required.

The reflector mirror block 22 is composed of an elongated reflector mirror 70 for reflecting laser beams 58a to 58b, and a mounting plate 72 which not only supports one end 70a of the mirror 70 but also helps it to be attached to the side wall 38b of the housing 16. The end 70a of the mirror 70 is secured vertically to the mounting plate 72. The other end 70b of the mirror 70 is coupled to a support member 74.

The support member 74 is secured to the bottom 76 of the housing 16 and supports the reflector mirror 70 by detachable engagement with its end 70b.

The mounting plate 72 is attached to the side wall 38b of the housing 16 by fastening means 40 such as screws in such a way that the plate can be dismounted or remounted as required without destroying the hermeticity in the housing 16. The reflector mirror 70 is adjustable in reflection angle and guides the laser beams 58a to 58b downward to fall on the appropriate scanning position on the object 78 to be scanned.

A light transmitter 82 is provided on the bottom 76 of the housing 16 in the vicinity of the reflector mirror block 22 for the purpose of transmitting the laser beams 80a to 80b reflected from the mirror 70. The light transmitter 82 may be of any type that allows for transmittance of a light beam such as a laser beam. Suitable examples include a transparent polyacrylic plate and glass plate. The light transmitter 82 may be attached to the housing 16 by any method that maintains hermeticity within the housing. A preferred method is such that the transmitter 82 can be dismounted from the outside of the housing 16 through the side wall 66b.

The optical system of the light beam scanning apparatus 10 is so designed that the laser beam 26 radiated from the laser light source 24 is deflected by the galvanometer mirror 52 over the range from 80a to 80b to define a single main scanning line 86 on the object 78 in sheet form in the sub-scanning unit 14. The sub-scanning unit 14 has sub-scanning transport means 88 such as rollers and a belt conveyor for transporting the object 78 in sheet form such as a stimulable phosphor sheet in a direction indicated by arrow A that is generally perpendicular to the main scanning line 86. A light guide 90 is disposed along the main scanning line 86 and at a predetermined distance from the object 78 in sheet form that is to be transported in the direction indicated by arrow A. The light guide 90 is made of a light conductive sheet material and one end thereof serves as a light entrance 90a which is substantially equal in length to the main scanning line 86. The other end of the light guide 90 is so shaped that it fits the light-receiving face of a photodetector 92 composed of a photoelectric converter such as a photomultiplier. Upon scanning with a laser beam from 80a to 80b, the object 78 in sheet form such as a stimulable phosphor sheet radiates stimulated emission, all of which is launched into the light guide 90 and transmitted to the photodetector 92 through said light guide 90 serving as a light transmitting means.

By transporting the object 78 in the sub-scanning direction indicated by arrow A as it is scanned with a laser beam from 80a to 80b along the main scanning line 86, the entire surface of the object 78 in sheet form can be scanned. The speeds of main scanning and sub-scanning are simultaneously controlled in such a way that all of the image related information stored in the object 78 can be read as a result of its scanning.

While the foregoing is the composition of a light beam scanning apparatus for use in reproducing image related information with the incorporated optical unit of the present invention, this is not the sole application of this unit and it may be incorporated in a light beam scanning apparatus for use in recording the reproduced image related information on a recording medium such as a photographic material.

One feature of the optical unit of the present invention is that various optical elements are grouped into blocks as small units. These blocks may be adapted to be dismountable from the sides, or top or bottom of the housing but preferably they are designed to be detachable from the sides of the housing. Dirt or dust will readily get into the housing if the blocks are disconnected from the top of the housing. On the other hand, it is often difficult to detach the blocks from the bottom of the housing.

The optical elements that can be grouped into blocks for incorporation in the optical unit of the present invention are not limited to those shown in FIG. 1. Various other optical elements and sensors that are commonly included in the optical system of a light beam scanning apparatus may be grouped into blocks as small units, and they include not only beam position adjusting lenses and position sensors for maintaining the normal position of a laser beam at all times, but also forward reading lenses, various cylindrical lenses for use in a tilting compensation system, mirrors, grids, light collecting bars, and photoelectric converters. If desired, various optical elements (not shown) may be included within the blocks shown in FIG. 1, or alternatively, the optical elements of the same block may be separated into two or more sub-blocks.

The light deflector block 20 shown in FIG. 1 includes the light deflector 50 and the scanning lenses 60; however, the light deflector block 20 may be divided into two subblocks, namely a light deflector block 21 and a scanning lenses block (not shown). An example of the light deflector block 21 is shown in FIGS. 2a and 2b.

Figure 2A:
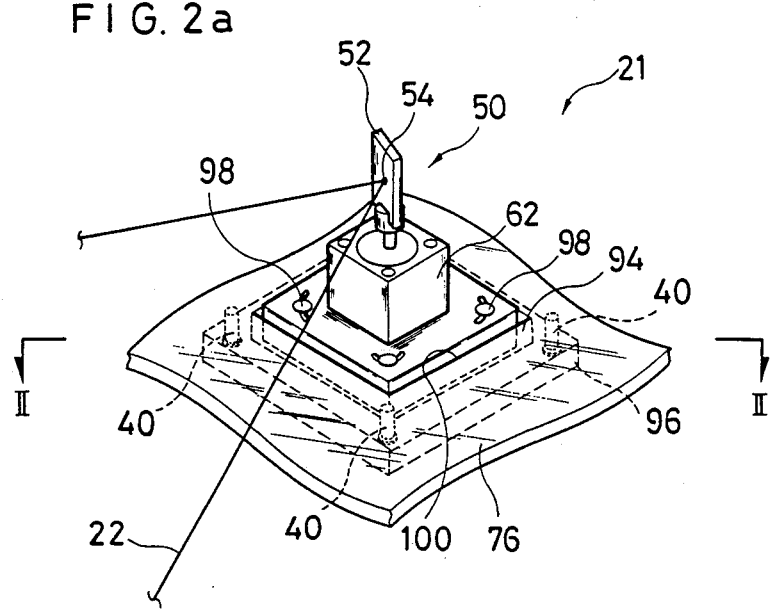
FIG. 2a is a partially cutaway perspective view of another example of the light deflector incorporated into the optical unit of the present invention.
Figure 2B:
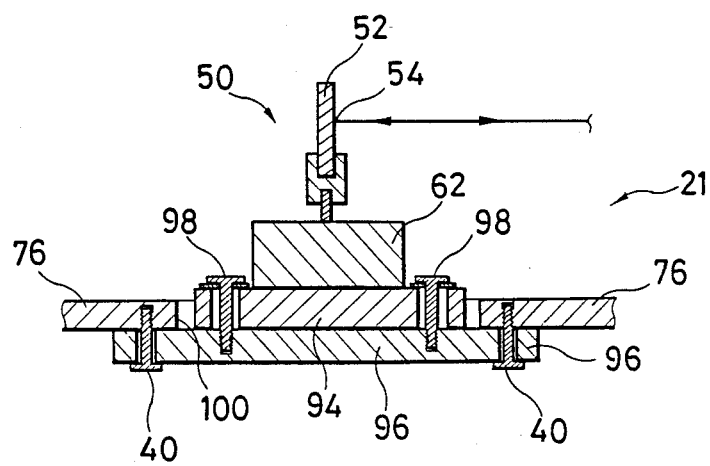

FIG. 2a is a partially cutaway perspective view of the light deflector block 21 incorporated into the optical unit of the present invention. FIG. 2b is a crosssectional view along the line II—II of FIG. 2a. Apparent from these FIGS. 2a and 2b, the light deflector block 21 is composed of the light deflector 50, and double mounts 94 and 96 for fine adjustment of the light deflector 50 thereon. For example, said fine adjustment may be made between the second mount 96 and the first mount 94 on which the light deflector 50 is secured as by fastening means 98. The light deflector block 21 thus finely adjusted may be secured by fastening the second mount 96 on the bottom 76 of the housing 16 by fastening means 40 with the light deflector 50 projecting through an opening 100 inwardly of the housing 16.

The optical unit shown in FIG. 1 does not include a cooling means in the housing. If heat generation can be a problem, a cooling air may be blown into the housing through a filter that entraps unwanted dirt or dust particles.

In the optical unit shown in FIG. 1, the blocks of optical elements are attached to the side walls of the housing by applying fastening means such as screws from the outside of the housing so as to maintain hermeticity in its interior. Any other fastening means may be employed so long as they effectively prevent the ingress of dirt or dust into the housing. In addition, complete hermeticity need not be maintained in the interior of the housing if this requirement is met.

OPERATION

The optical unit of the present invention having the basic composition described above will operate as follows.

The laser beam 26 radiated from the laser light source 24 passes through the optical filter 30 so that the unwanted wavelength region of the beam is cut off. The beam 26 then passes through the beam expander 32 to have its diameter closely controlled. Thereafter, the beam 26 is reflected by the reflector mirror 34 and travels on the path 28 toward the deflection point 54 on the galvanometer mirror 52 in the light deflector 50.

By driving the galvanometer 62 in the light deflector 50, the galvanometer mirror 52 is swung through a predetermined angle and the laser beam 28 is deflected from 58a to 58b while it is adjusted by the scanning lens 60 to converge on the surface to be scanned. The deflected laser beam is reflected by the reflector mirror 70 to be guided downward and transmitted through the light transmitter 82 disposed on the bottom 76 of the housing 16. The transmitted beam moves from 80a to 80b to define the main scanning line 86 on the object 78 to be scanned.

Simultaneously with the above operation, the object 78 is transported by the sub-scanning transport mechanism 88 in the direction indicated by arrow A and the entire surface of the object is scanned two-dimensionally in a correct and appropriate manner.

The stimulated emission radiating from the object 78 upon scanning with laser beams 80a to 80b is collected by the light guide 90 and objected to photoelectric conversion in the photodetector 92. As a result, the image related information stored in the object 78 is read as electrical signals in a reliable and smooth manner.

The laser light source 24, optical filter 30, beam expander 32, reflector mirror 34, light deflector 50, reflector mirror 70 and other optical elements in the optical unit of the present invention are grouped into blocks as small units and installed in the interior of the housing 16 in such a way that hermeticity is maintained in it. Therefore, the ingress of dirt or dust particles into the housing is completely prevented and there is no possibility that the optical elements listed above will be soiled by the deposition of dust or dirt particles.

In addition, these optical elements are attached to the side walls 38a, 38b, 66a and 66b of the housing 16 from its outside by fastening means 40 such as screws. In case of replacement or adjustment, such optical elements can be readily dismounted by dislodging the fastening means 40 such as screws from the individual blocks in small units. Remounting of optical units can also be accomplished with ease. Therefore, during replacement of optical units, the interior of the housing 16 will contact the atmosphere only momentarily and the area of contact with the atmosphere is limited to the particular block to be replaced, so that the ingress of dirt or dust particles into the housing can be held to a minimum.

ADVANTAGES OF THE INVENTION

In the present invention, optical units used in a light beam scanning apparatus, or those components which must be protected against dust and which need to be replaced occasionally, are grouped into blocks as small units and mounted in a housing from the outside in such a way that hermeticity is maintained in its interior. This contributes to complete prevention of the ingress of dirt or dust particles into the housing during the service of the light beam scanning apparatus.

As a further advantage, the optical units grouped into blocks as small units and which are mounted from the outside of the housing can be dismounted or remounted both individually and readily as required in the case of replacement or adjustment of such optical elements. Furthermore, during replacement, the interior of the housing will communicate with the ambient atmosphere only momentarily and the area of contact with the atmosphere is limited to the particular block to be replaced, so the ingress of dirt or dust particles into the housing can be held to a minimum.

If the optical elements that need further adjustment are preadjusted before they are installed in the housing, the need to perform adjusting operations within the light beam scanning apparatus is eliminated. This not only prevents the chance of dirt or dust particles of being deposited in the apparatus or otherwise fouling the same; it also enables easy and precise adjustment of optical elements of interest.

Because of the advantages described above, a light beam scanning apparatus incorporating the optical unit of the present invention ensures that image related information can be reproduced from, or recorded on, an object to be scanned in sheet form in a correct and appropriate manner at all times of its operation.

What is claimed is:

1. An optical unit for use in a light beam scanning apparatus, said optical unit comprising a housing and an optical element accommodated in an interior of said housing, said optical element being detachably mounted in said housing from an outside of said housing such that hermeticity is maintained in said interior of said housing.

2. An optical unit according to claim 1 wherein said optical unit comprises means for outputting a one-dimensionally deflected light beam, and wherein said light beam scanning apparatus scans a stimulable phosphor sheet in two-dimensional way by illumination with said one-dimensionally deflected light beam, so as to read stimulated emission in association with radiation-produced image related information.

3. An optical unit according to claim 1 wherein said optical unit comprises means for outputting a one-dimensionally deflected light beam, and wherein said light beam scanning apparatus records radiation-produced image related information on a photographic material by scanning it two-dimmensionally with said one-dimensionally deflected light beam.

4. An optical unit according to claim 1 wherein said optical element comprises at least one member selected from the group consisting of a laser light source, an optical filter, a beam expander, a reflector mirror, a light deflector, and a scanning lens.

* * * * *